United States Patent
Froels et al.

(10) Patent No.: US 9,184,913 B2
(45) Date of Patent: Nov. 10, 2015

(54) AUTHENTICATING A TELECOMMUNICATION TERMINAL IN A TELECOMMUNICATION NETWORK

(75) Inventors: Martin Froels, Bonn (DE); Martin Tessmer, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/239,560

(22) PCT Filed: Aug. 22, 2012

(86) PCT No.: PCT/EP2012/066337
§ 371 (c)(1),
(2), (4) Date: Feb. 19, 2014

(87) PCT Pub. No.: WO2013/026875
PCT Pub. Date: Feb. 28, 2013

(65) Prior Publication Data
US 2014/0219448 A1    Aug. 7, 2014

(30) Foreign Application Priority Data

Aug. 24, 2011   (DE) .................. 10 2011 110 958
Nov. 14, 2011   (DE) .................. 10 2011 118 367

(51) Int. Cl.
*H04K 1/00*       (2006.01)
*H04L 9/14*       (2006.01)
(Continued)

(52) U.S. Cl.
CPC ................. *H04L 9/14* (2013.01); *H04W 12/06* (2013.01); *H04L 9/3247* (2013.01); *H04L 9/3263* (2013.01);
(Continued)

(58) Field of Classification Search
CPC ... H04L 63/0823; H04L 63/0853; H04L 9/14; H04L 63/062; H04L 63/0442; H04L 63/0442; H04L 9/3247; H04L 9/3263; H04L 2209/24; H04W 12/06; H04W 12/04; H04W 12/12; G06F 21/64
USPC .......................................... 380/255
See application file for complete search history.

(56) References Cited

U.S. PATENT DOCUMENTS

2003/0221104 A1*   11/2003   Baessler ................. 713/175
2008/0005567 A1*    1/2008   Johnson ................. 713/172
2009/0124287 A1     5/2009   Weiss et al.
2012/0201383 A1*    8/2012   Matsuo ................... 380/255

FOREIGN PATENT DOCUMENTS

EP    1365537 A1   11/2003
EP    1873668 A1    1/2008
(Continued)

*Primary Examiner* — Shewaye Gelagay
*Assistant Examiner* — Amie C Lin
(74) *Attorney, Agent, or Firm* — Leydig, Voit & Mayer, Ltd.

(57) ABSTRACT

A method for authenticating a telecommunications terminal having an identity module includes: storing a first private key, a first public key and a first signature, the first signature being based on signing the first public key using a second private key; generating identity information and a second signature, the second signature being based on signing the identity information using the first private key; transmitting the first public key, the identity information, and the first and second signatures to a server device; verifying, by the server device, the authenticity of the first public key using a second public key; and verifying, by the server device, the authenticity of the identity information using the verified first public key. The identity information includes International Mobile Subscriber Identity (IMSI) information.

17 Claims, 1 Drawing Sheet

(51) Int. Cl.
*H04W 12/06* (2009.01)
*H04L 9/32* (2006.01)
*H04L 29/06* (2006.01)

(52) U.S. Cl.
CPC ............ *H04L 63/062* (2013.01); *H04L 63/0823* (2013.01); *H04L 63/0853* (2013.01); *H04L 2209/24* (2013.01)

(56) References Cited

FOREIGN PATENT DOCUMENTS

| WO | WO 2005041608 A1 | 5/2005 |
| WO | WO 2007006535 A1 | 1/2007 |
| WO | WO 2007087432 A2 | 8/2007 |
| WO | WO 2009126994 A1 | 10/2009 |

* cited by examiner

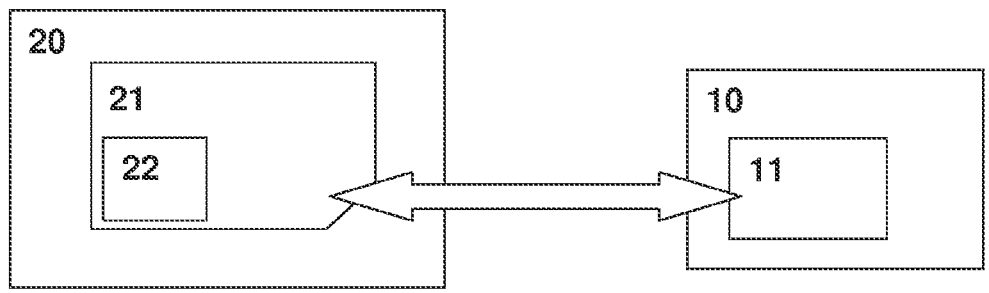

ically and economically. In this case, an identity module is generally understood to be a module which—like, for example, a SIM card or a USIM card—contains identity information for a subscriber identification in a mobile communication network or telecommunication network.

AUTHENTICATING A TELECOMMUNICATION TERMINAL IN A TELECOMMUNICATION NETWORK

CROSS-REFERENCE TO RELATED APPLICATIONS

This application is a U.S. National Phase application under 35 U.S.C. §371 of International Application No. PCT/EP2012/066337, filed on Aug. 22, 2012, and claims benefit to German Patent Application Nos. DE 10 2011 110 958.0, filed on Aug. 24, 2011 and DE 10 2011 118 367.5, filed on Nov. 14, 2011. The International application was published in German on Feb. 28, 2013 as WO 2013/026875 A1 under PCT Article 21(2).

FIELD

The invention relates to a method for authenticating a telecommunication terminal comprising an identity module on a server device in a telecommunication network, wherein identity information uniquely allocated to the identity module is used for the authentication using the properties of an asymmetric cryptographic method.

Furthermore, the invention also relates to the use of an identity module, to an identity module and to a computer program and a computer program product.

BACKGROUND

In the use of Internet services, the problem of user authentication or authentication of users frequently occurs. It is not presently possible to identify users of a service on the Internet in a secure manner. The recently introduced electronic identity card is a first step in this direction, but it requires the purchase of a read device for the NFC-based data transmission used. This purchase is not worthwhile if the customer wishes to use a service sporadically. Furthermore, the electronic identity card will not be globally available for some time.

In addition, it may be appropriate for a mobile operator not to identify a customer by name and address, but rather using the IMSI information allocated to the customer, i.e. the IMSI number (IMSI=International Mobile Subscriber Identification), since this is also used, where appropriate, as an identity feature in the billing systems.

Furthermore, a potential customer of an Internet service is always faced with the problem of allocation of usernames and passwords, insofar as the Internet service is to be able to be used again at a later time.

Insofar as a customer with a mobile terminal, i.e. a telecommunication terminal which comprises or contains an identity module, is registered in the telecommunication network of a mobile operator, it is easily possible for the mobile operator to identify the customer, since the mobile operator controls all network elements of the telecommunication network. The allocated IP address, for example, can thus be used as an identification feature.

However, if the mobile operator wishes to offer services outside its closed network (in order, for example, to keep security-critical components out of the inner core network, or to be able to offer a service not only to customers, but also to non-customers), the same problems occur which an external service provider also has.

Asymmetric cryptographic methods are known from the prior art, in which each of the communicating parties has a key pair which consists of a secret part (private key) and a non-secret part (public key). The public key allows anyone (i.e. a third party who knows the public key) to encrypt data for the owner of the private key. The private key allows its owner to decrypt data with the public key. The private key furthermore allows the owner to sign data, wherein a third party who knows the public key can check the signature generated in this way. For this purpose, the data are encrypted by the owner of the private key with the private key. The public key then allows the third party to verify the authenticity of these data signed (i.e. encrypted) with the private key by decrypting the data with the public key and comparing them with similarly transferred data in clear text. In contrast to a symmetric cryptographic method, the communicating parties do not have to know a common secret key.

SUMMARY

In an embodiment, the invention provides a method for authenticating, on a server device in a telecommunications network, a telecommunications terminal having an identity module. Identity information uniquely allocated to the identity module is used for the authentication using asymmetric cryptography. A first key pair including a first public key and a first private key is allocated to the identity module. A second key pair including a second public key and a second private key is allocated to the server device. The method includes: storing, at the identity module, the first private key, the first public key and a first signature, the first signature being based on signing the first public key using the second private key; generating the identity information and a second signature, the second signature being based on signing the identity information using the first private key; transmitting the first public key, the identity information, and the first and second signatures to the server device; verifying, by the server device, the authenticity of the first public key using the second public key; and verifying, by the server device, the authenticity of the identity information using the verified first public key. The identity information comprises International Mobile Subscriber Identity (IMSI) information corresponding to the identity module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic view of a telecommunication terminal comprising an identity module and a telecommunication network with a server device.

DETAILED DESCRIPTION

The invention provides a method for authenticating a telecommunication terminal on a server device which can be carried out simply and economically and nevertheless offers a high degree of security against attempted fraud or other manipulations.

A first embodiment includes a method for authenticating a telecommunication terminal comprising an identity module on a server device in a telecommunication network, wherein identity information uniquely allocated to the identity module is used for the authentication using the properties of an asymmetric cryptographic method, wherein a first key pair comprising a first public key and a first private key is allocated to the identity module, wherein a second key pair comprising a second public key and a second private key is allocated to the server device, wherein the method has the following steps:

in a first method step, in a memory area of the identity module, the first private key is stored, the first public key is stored, and a first signature is stored, wherein the first signature is provided according to the cryptographic method by the signing of the first public key using the second private key, in a second method step, the identity information uniquely allocated to the identity module is generated by the identity module and a second signature is generated, wherein the second signature is provided according to the cryptographic method by the signing of the identity information using the first private key, in a third method step, the first public key, the identity information, and the first and second signatures are transmitted to the server device, in a fourth method step, the authenticity of the first public key is verified using the second public key, and the authenticity of the identity information is checked using the verified first public key, by the server device.

A second embodiment includes a method for authenticating a telecommunication terminal comprising an identity module on a server device in a telecommunication network, wherein identity information uniquely allocated to the identity module is used for the authentication using the properties of an asymmetric cryptographic method, wherein a first key pair comprising a first public key and a first private key is allocated to the identity module, wherein a second key pair comprising a second public key and a second private key is allocated to the server device, wherein the method has the following steps:

in a first method step, in a memory area of the identity module, the first private key is stored, the first public key is stored in encrypted form, wherein the encryption of the first public key is provided according to the cryptographic method using the second private key, in a second method step, the identity information uniquely allocated to the identity module is generated in encrypted form by the identity module, wherein the encryption of the identity information is provided according to the cryptographic method using the first private key, in a third method step, the first public key is transmitted in encrypted form and the identity information is transmitted in encrypted form to the server device, in a fourth method step, the encrypted first public key is decrypted using the second public key, and the identity information is decrypted using the decrypted first public key by the server device.

According to both embodiments, it is possible in an advantageous manner according to the invention for a high degree of security and simultaneously a high degree of user convenience to be provided not only for mobile operators wishing to identify their customers via the Internet, but also for external service providers who, in collaboration with a mobile operator, wish to recognize customers in a secure manner, since the administration and memorization of a multiplicity of user names and passwords are dispensed with.

According to the present invention, it is possible in a cryptographically secure manner according to both embodiments to identify a customer of the mobile company using identity information, for example his unique IMSI. An application in a modern mobile terminal could read the identity information, in particular the IMSI, similarly from the identity module, in particular the SIM card, but this identity information can be manipulated at will by the mobile application. A method of this type is therefore unhelpful from the point of view of the highest possible security level.

An application issued by a mobile company will typically forward the identity information (in particular the IMSI) without manipulation. However, it is possible in the case of the current intelligent mobile terminals (telecommunication terminals) to smuggle in applications which eavesdrop on and, where appropriate, manipulate the communication of other applications with the identity module (in particular the SIM card). A different manipulation possibility involves a (smuggled in) application which infiltrates the TCP/IP communication stack on the mobile terminal and manipulates the communication of the application of the mobile company with a server or with a server device on the Internet. According to the invention, it is advantageously possible in this respect for a transmission of the identity information (in particular the IMSI) from the telecommunication terminal (in particular the identity module of the telecommunication terminal or in particular the SIM card) to be guaranteed in a manipulation-proof manner via an application contained in the mobile telecommunication terminal to a server or a server device on the Internet.

The SIM card is used below as a classic example of an identity module. The designations "SIM card" and "identity module" are therefore used synonymously below. The SIM card is a generally acknowledged secure memory space for data of any type. In addition, modern SIM cards with a SmartCard functionality (SIM cards of this type are also referred to below as SmartCards)—supported, where appropriate, by a coprocessor for cryptographic calculations—control complex cryptographic computing operations. These calculations can be carried out with symmetric (such as, e.g. 3DES or AES) or asymmetric (RSA/elliptical curves) encryption methods. Furthermore, modern SmartCards have a generator for high-quality random numbers. The SIM card is thereby able to calculate a key pair for asymmetric RSA operations "on-board", i.e. without having to make use of computing resources or processor resources outside the SIM card. Since the secret keys remain within the SIM card in this method, the security of such methods is considerably increased.

Every currently conventional, modern SIM card in the banking or telecommunication environment has the three characteristics—secure memory, cryptographic functionality, secure generation of random numbers. If SIM cards are mentioned below, this is also to be understood as a synonym for cards from the banking environment (i.e. for bank applications). The use of the crypto-coprocessor, which significantly speeds up the generation of asymmetric key pairs and also asymmetric calculations, in particular encryptions or decryptions, is optional. The greater the increase in computing speed is here, the more data have to be encrypted or decrypted.

According to the invention, it is particularly advantageous that the use of the IMSI as identity information is usable in a double sense, namely, on the one hand, as identity information (i.e. to identify the customer or user of the telecommunication network) and, on the other hand, for authentication; the customer or user of the telecommunication network can dispatch the authentication message only if the associated IMSI is also valid, i.e. has not been blocked by the network operator of the telecommunication network. According to the invention, it is in particular advantageously possible that an identification is possible over network structures which can be manipulated in any given manner.

According to the invention, it is particularly advantageous that the identity information, i.e. the IMSI, is an original component of the customer data (and that the security mechanism is not—as in other methods with increased security requirements—based on the carrying out of a decryption of a message with a public certificate). The evidence of authenticity is provided according to the invention through decryption of the public SIM key using the private service key; the decryption of the SIM message using the public SIM key.

According to the present invention, the security medium is exclusively the SIM card. This is possible according to the invention because the SIM card always contains or must contain the IMSI information, i.e. the identity information. According to the invention, it is advantageously possible in relation to protective measures through the use of the IMSI as identity information that, when suspicious circumstances arise, the IMSI can simply be blocked by the network operator so that the message cannot even be dispatched from the mobile terminal.

According to both embodiments, the invention uses a multiple combination of the characteristics described above in order to identify an identity module (or its unique identity information) and consequently a customer in a manipulation-proof, unique and indisputable manner. This customer identification is intended to take place on a server which is contactable e.g. via the Internet or a mobile network. This server offers any service that requires or at least makes it appear beneficial that the customer (or the identity information) is securely authenticated (e.g. to produce invoices, to make payments or the like).

The preparations for using the customer authentication according to the present invention take place on the premises of a manufacturer of the identity module, i.e. in particular the SIM card manufacturer. Said manufacturers have certified security areas in which the SIM cards are manufactured under controlled conditions.

A program which is run on the SIM card is used for the administration of the data and as a control unit for the data processing on the SIM card. A Java Card™ environment is contained in all modern SIM cards as a runtime environment. This runtime environment is characterized by increased security requirements compared with the Java known on workstation computers, private computers or servers. Thus, for example, all applications contained in a SIM card (in this environment they are referred to as applets) are isolated from one another by a firewall controlled by the runtime environment.

The source code of the applet used for the invention can readily be published, as the security of the invention is founded on the cryptographic methods used.

In the present invention, two asymmetric key pairs are used: on the one hand, a (first) key pair which is allocated to the identity module and is generated in particular within the identity module, i.e. within the SIM card. This first key pair is also referred to below as the SIM key pair. The first key pair comprises a first public key and a first private key. According to the SIM key pair designation, the first public key is also referred to below as the public SIM key and the first private key is also referred to below as the private SIM key. According to the invention, the second key pair is allocated to the server device. This second key pair is also referred to below as the server key pair. The second key pair comprises a second public key and a second private key. According to the server key pair designation, the second public key is also referred to below as the public server key and the second private key is also referred to below as the private server key. From the second key pair, the private server key is required in the manufacture of the SIM card and the private server key is required in the authentication of the customer on the server.

According to the present invention, it is preferred that an applet is first loaded on the premises of the SIM card manufacturer onto the SIM card and is installed there. An asymmetric key pair which is allocated to the identity module, i.e. the first key pair, is generated thereafter within the SIM card. According to a preferred design of the present invention, the private server key of the server key pair is next loaded onto the SIM card and the public SIM key is signed with the private server key (according to the first embodiment) or is encrypted (according to the second embodiment). Immediately thereafter, the server key is deleted once more on the SIM card. Alternatively, the public SIM key could also be exported from the SIM card, in particular into a high-security module, signed with the private server key (according to the first embodiment) or encrypted (according to the second embodiment) and the result of this operation could then be saved once more back onto the SIM card.

To identify the SIM card or the customer (in the operation of the SIM card or in its use), an application in the mobile terminal into which the SIM card is inserted transmits a command to the SIM card. The SIM card then reads out the identity information, according to the invention in particular the IMSI information or IMSI number, from the publicly accessible directory structure within the memory area of the SIM card. The identity information (or IMSI number) is stored there in such a way that it is readable from outside—in particular following the input of confidential information, for example the SIM PIN (SIM Personal Identification Number)—but can never be overwritten.

According to the present invention, it is furthermore preferred that, in order to generate the identity information and its signature (second signature according to the first embodiment) (or according to the second embodiment in order to generate the identity information in encrypted form), the following procedure is carried out: After the identity information, in particular the IMSI, has been read, the applet (i.e. program) loaded onto the SIM card instigates the generation of a secure random number with a length of e.g. 16 characters and places it at the beginning of the response message. The identity information, i.e. in particular the IMSI number, is thereafter copied into the response message and (according to the first embodiment) a hash (coefficient of variation) is formed from the response message using a suitable mathematical one-way function. In a following step, said hash is filled at the end with filler bytes until the length necessary for an encryption operation with the asymmetric private SIM key is attained. Alternatively, it is also possible according to the second embodiment, following the generation of the secure random number with a length of e.g. 16 characters and its placement at the beginning of the response message, for the IMSI number to be copied and the response message to be filled at the end with filler bytes until the length necessary for an encryption operation with the asymmetric private SIM key is attained.

In both embodiments, in order to prevent replay attacks, the value of a counter or a counter value is incorporated into the message, wherein the value of the counter or the counter value is changed for each newly generated message, for example is increased or reduced or (in a pre-defined manner) otherwise changed.

According to both embodiments, all data contained in the message (i.e. in particular the IMSI and the counter value also) are preferably not stored directly after one another in the response message, but rather in each case in the form of a TLV-formatted list (TAG Length Value), i.e. in a structured format in such a way that, for the transmission of length-variable data fields, first an identifier (or "tag") is stored, then a numeric length indication in which the number of characters or bytes is indicated and which corresponds to the subsequent useful data content, and finally the characters or bytes or the information content of the user data themselves.

The three different data are identified in each case by a different identifier (or "tag"). The identifier (or "tag") is followed by the length indication of the actual datum and then the data content or the datum itself.

In order to achieve the indisputability of the authentication of the customer (or the identity module) according to the present invention, it is preferably provided according to the invention that the customer must enter confidential information (in particular a PIN number or PIN information) before the concluding signature (according to the first embodiment) or the encryption (according to the second embodiment) of the response data (or the response message). The confidential information (or the PIN number or PIN information) can be entered in different ways, in fact even on a logical communication channel different from the channel used to request and receive the authentication message. The probability of attacks or their success rate can thus be further reduced. The confidential information (or PIN number or PIN information) is essentially stored within the SIM card and the comparison with the input (in particular by a user interface of the telecommunication terminal of the customer) of the confidential information by the customer is similarly preferably carried out exclusively on the card.

First of all, the application on the telecommunication terminal can ask the customer, in particular by the user interface of the telecommunication terminal, to enter confidential information, in particular PIN information. This application then transmits the authentication request together with the confidential information (or PIN information) entered by the customer to the applet on the SIM card. Following successful checking of the confidential information, the applet generates within the SIM card, according to the first embodiment, the signature of the response message or, according to the second embodiment, the encrypted response message.

In the telecommunication environment, all SIM cards and mobile terminals (or telecommunication terminals) use a protocol known as the SIM Toolkit. This allows the SIM card to transmit commands to and receive responses from the telecommunication terminal. According to the present invention, every applet on a SIM card can communicate with a mobile terminal not only via the APDU (Application Protocol Data Unit) interface, but also via the SIM Toolkit interface. It is also possible and preferable according to the invention for the two communication channels to be used alternately after one another.

As a second channel, the input of the confidential information (or the PIN input) can be performed via the SIM Toolkit. This communication channel logically already ends in the modem of the mobile terminal; SIM Toolkit commands do not therefore appear on the communication channel normally used between the application and the SIM card. This increases the security of SIM Toolkit commands in relation to fraudulent or malicious applications on the mobile terminal.

In the present invention, the SIM card transmits, for example, the SIM Toolkit command "Get Input" to the mobile terminal, i.e. to the telecommunication terminal. A component of this command is a text with which the user is prompted to enter the confidential information (i.e. to enter the PIN), e.g. "Please enter PIN for the identification service". Furthermore, an option can be set in the SIM Toolkit command so that the mobile terminal does not display the digits entered by the user, but hides them using "*". After the user has entered the confidential information (i.e. in particular the PIN information), the mobile terminal transmits the response to the card, which can then check the confidential information (i.e. the PIN information).

According to the present invention, it is furthermore preferably provided (according to both embodiments) that the response message generated according to the second method step or the response message transmitted according to the third method step to the server device contains an information element which informs (the server device) whether and on which communication channel a PIN check has taken place. This information element is contained in the response message, preferably in TLV-coded form.

After the message has been sent by the application on the mobile terminal, in particular via the Internet, to the server device in the third method step according to the first embodiment of the present invention, the server device can check the authenticity of the public SIM key using the public server key by verifying the signature of the public SIM key. With this public SIM key, the server device can check the authenticity of the signed data, i.e. the response message of the telecommunication terminal, which contain in particular the identity information—but preferably also further information such as, for example, the information indicating whether (and if so, how) a confidential information check (PIN check) has been carried out—(i.e. in particular the IMSI number). The check on the authenticity of data is preferably carried out through decryption of the hash value of the signature with the public key and a subsequent comparison of the hash value thus obtained with a hash value newly calculated via the data present in clear text.

The following applies to the second embodiment: After the encrypted message has been sent from the application on the mobile terminal, in particular via the Internet, to the server device in the third method step of the present invention, the server device can decrypt the encrypted public SIM key using the public server key. With this (now decrypted) public SIM key, the server device can decrypt the encrypted data, i.e. the encrypted response message of the telecommunication terminal which contains, in particular, the identity information—but preferably also further information such as, for example, the information whether (and if so, how) a confidential information check (PIN check) has been carried out—(i.e. in particular the IMSI number). If both decryption operations were successful, the identity information (i.e. in particular the IMSI number) is present in clear text on the server device, which can then use it for further operations.

The server can identify the customer or the identity module using the transferred and unique identity information (in particular the unique IMSI number), for example to instigate payment processes and/or to notify the application on the mobile terminal that the necessary prerequisites for releasing the full functional capability of the application are in place (automatic conversion of a trial version into a full version) or can instigate further actions by the server device or by the application.

The security in the present invention is based on the realization that asymmetric cryptographic methods can only be broken according to current knowledge if a sufficiently long key pair is selected, or can only be broken with a disproportionately great effort.

In the present invention, it must be emphasized in particular that both the authenticity (in the first embodiment) and the confidentiality (in the second embodiment) of the transmitted data are guaranteed, and it is also guaranteed that it can be stated in indisputable form that the identity information (in particular the IMSI number) transferred from the SIM card of the customer or user actually originates from this identity module (i.e. this SIM card) and (in particular in the variant with mandatory input of confidential information, for example in the form of PIN information) the customer or the user had to have knowledge of this process.

Through reduction of the calculation rules used e.g. in RSA cryptosystems to the minimum extent necessary for the present invention, it is advantageously possible according to the invention to dispense with the setting up of complex PKI systems as are otherwise necessary (in particular in order to be able to recognize withdrawn certificates), but nevertheless to be able to exploit the advantages of the increased security level associated with the use of the principles of RSA cryptosystems. In addition, all necessary calculation steps can be carried out within the SIM card and are therefore available to the customer or the user at all times and in all places. Furthermore, the attack vector can hereby be reduced or totally avoided according to the invention, since the SIM card receives a prompt to generate the secure message only from outside and the SIM card already contains all necessary data, keys and cryptographic methods in manipulation-proof and manipulation-protected form. Also in terms of the service life, the use of the SIM card is advantageous according to the invention, since a use is possible as long as the SIM card is technically functional, but is not dependent on the term or validity period of a credit card.

Furthermore, it is advantageously possible according to the invention that the use of certificates certified by third parties, for example a trust center, can be dispensed with. These certificates take up several KB (kilobytes, i.e. several times 1024 bytes) of memory on the SIM card. Compared with other semiconductor modules, this memory is very expensive in the case of the SIM card and is therefore provided only in the necessary minimum quantity.

It is preferably provided according to the invention that the telecommunication terminal has a user interface, wherein a user input of confidential information is provided via the user interface of the telecommunication terminal temporally before or during the second method step.

Furthermore, it is preferably provided according to both the first and the second embodiments that the transmission takes place in the third method step using an encryption protocol, for example an SSL encryption protocol (Secure Socket Layer) or a TLS encryption protocol (Transport Layer Security).

The security in carrying out the method according to the invention can again be increased as a result.

Furthermore, it is preferably provided according to both the first and the second embodiments that, in the transmission, counter information is additionally transmitted in the third method step, wherein the transmission of the counter information allows the server device to distinguish the transmission of a temporally preceding first message transmission according to the third method step from a temporally following second message transmission according to the third method step, in particular using a database present in the server device or allocated to the server device.

It can hereby be guaranteed that the security of the method according to the invention is further improved. This is achieved, for example, in that (in both embodiments) the server (i.e. the server device), following a completed check of the signatures (according to the first embodiment) or following decryption of the messages (according to the second embodiment), compares the value of the counter (or the counter value) of the message just received with the value of the last valid message. This older counter value is preferably stored in a database (either disposed in the server device or allocated to the server device) and is allocated to the IMSI contained in the message. The new message is regarded as valid only if the new counter value differs from the old (i.e. immediately preceding) counter value (and preferably also from the counter values used immediately previously for this IMSI), for example is greater than the old counter value. In this case, the new counter value is stored in the database. The IMSI is preferably not stored directly in the database, but only its hash value (coefficient of variation) generated using a mathematical method.

According to the invention, it is furthermore preferably provided according to the first embodiment that a third key pair comprising a third public key and a third private key is allocated to the server device or to a further server device, wherein a third signature is stored during the first method step in the memory area of the identity module, wherein the third signature is provided by the signing of the first public key with the third private key according to the cryptographic method, wherein, during the third method step, the first public key and the first and third signatures are transmitted to the server device, and wherein, during the fourth method step, the third signature is checked using the third public key, and the first signature is checked using the first public key, by the server device.

According to the second embodiment of the invention, it is furthermore preferably provided that a third key pair comprising a third public key and a third private key is allocated to the server device or to a further server device, wherein, during the first method step, the first public key is stored in a further encrypted form in the memory area of the identity module, wherein the further encrypted form of the first public key is an encryption of the first public key using the third private key according to the cryptographic method, wherein, during the third method step, the first public key is also transmitted in the further encrypted form to the server device, and wherein, during the fourth method step, the first public key in the further encrypted form is decrypted using the third public key, and the identity information is decrypted using the decrypted first public key, by the server device.

It is furthermore particularly preferred according to both the first and the second embodiments of the present invention that the identity information comprises the IMSI information (International Mobile Subscriber Identity) of the identity module.

According to the invention, it is furthermore preferred according to both the first and the second embodiments that the identity module is a SIM card (Subscriber Identity Module) or a USIM card (Universal Subscriber Identity Module).

A further subject-matter of the present invention relates to a use of an identity module in a method according to the invention.

A further subject-matter of the present invention according to the first embodiment furthermore relates to an identity module for the improved authentication of a telecommunication terminal on a server device of a telecommunication network, wherein identity information uniquely allocated to the identity module is provided for the authentication using the properties of an asymmetric cryptographic method, wherein a first key pair comprising a first public key and a first private key is allocated to the identity module, wherein a second key pair comprising a second public key and a second private key is allocated to the server device, wherein, in a memory area of the identity module, the first private key is stored, the first public key is stored, and a first signature is stored, wherein the first signature is provided by the signing of the first public key using the second private key according to the cryptographic method, wherein a second signature is furthermore provided, wherein the second signature is provided by the signing of the identity information uniquely allocated to the identity module using the first private key according to the cryptographic method, so that, a check of the first signature using the second public key, and a check of the second signature using the first public key, are enabled by the server device.

A further subject-matter of the present invention according to the second embodiment furthermore relates to an identity module for the improved authentication of a telecommunication terminal on a server device of a telecommunication network, wherein identity information uniquely allocated to the identity module is provided for the authentication using the properties of an asymmetric cryptographic method, wherein a first key pair comprising a first public key and a first private key is allocated to the identity module, wherein a second key pair comprising a second public key and a second private key is allocated to the server device, wherein, in a memory area of the identity module, the first private key is stored, and the first public key is stored in encrypted form, wherein the encryption of the first public key is provided using the second private key according to the cryptographic method, wherein a generation by the identity module of the identity information uniquely allocated to the identity module in encrypted form is furthermore provided, wherein the encryption of the identity information is provided using the first private key according to the cryptographic method, so that, a decryption of the first public key using the second public key, and a decryption of the identity information using the decrypted first public key, are enabled by the server device.

The present invention furthermore relates to a computer program with program code, by which all steps of the method according to the invention can be carried out if the computer program is run on an identity module, a computer or a corresponding computing unit.

A subject-matter of the present invention is furthermore a computer program product with a computer-readable medium and a computer program stored on the computer-readable medium with program code, which are suitable so that all steps of the method according the invention can be carried out if the computer program is run on an identity module, a computer or a corresponding computing unit.

Further details, features and advantages of the invention can be found in the drawings and in the following description of preferred embodiments with reference to the drawings. The drawings merely illustrate example embodiments of the invention which do not restrict the fundamental inventive idea.

FIG. 1 shows in a schematic manner a telecommunication terminal 20 with an identity module 21. The identity module 21 has a memory area 22. The identity module 21, which is designed in particular as a SIM card or a USIM card, is provided in such a way that an information exchange can take place in a secure manner with a server device 11 of a telecommunication network 10 (for example the Internet), resulting in the authentication of the identity module 21 or therefore the telecommunication terminal 20 or its user in the server device 11.

According to the present invention—in both the first and second embodiments—in order to effect an authentication of the telecommunication terminal 20 in the server device 11 or in order to effect an authentication of the identity module 21 which is located in the telecommunication terminal 20, a method which has four method steps is carried out in the server device 11. The method is based on the cryptographic properties of an asymmetric cryptographic method, for example the RSA method (Rivest, Shamir and Adleman method) using two key pairs, wherein a first key pair comprising a first public key and a first private key is allocated to the identity module 21 and wherein a second key pair comprising a second public key and a second private key is allocated to the server device 11.

In the first method step, which is carried out during the manufacture of the identity module 21, three information elements are stored in the first embodiment in the memory area 22 of the identity module 21: on one hand, the first private key, on the other hand, the first public key, and also a signature of the first public key using the second private key is carried out according to the cryptographic method used.

In the second embodiment of the invention, two information elements are stored in the first method step in the memory area 22 of the identity module 21: on the one hand, the first private key and, on the other hand, the first public key in encrypted form, wherein the encryption of the first public key is carried out using the second private key according to the cryptographic method used.

In the second method step, the identity information uniquely allocated to the identity module 21 is preferably generated in the first embodiment together with further information elements by the identity module 21, wherein a signing, on the one hand, of the identity information and, on the other hand, of the further information elements is subsequently provided using the first private key according to the cryptographic method.

In the second embodiment, the identity information uniquely allocated to the identity module 21 is preferably generated by the identity module 21 in the second method step together with further information elements in encrypted form, wherein the encryption, on the one hand, of the identity information and, on the other hand, of the further information elements is provided using the first private key according to the cryptographic method.

In the third method step, the first public key and the identity information are transmitted in the first embodiment together with their signatures to the server device 11. This transmission of the message can take place via a communication channel secured using SSL/TLS to ensure confidentiality.

In the second embodiment of the invention, in the third method step, the first public key in encrypted form and the identity information in encrypted form, i.e. an encrypted response message, are transmitted to the server device 11.

In the fourth method step, in the first embodiment, on the one hand, the authenticity of the first public key is checked using the second public key and, on the other hand, the authenticity of the identity information (i.e. the received encrypted response message) is checked using the first public key by the server device 11, so that the response message (and as part thereof in particular the identity information also) occurs or is present as a checked datum in the server device.

In the second embodiment of the invention, in the fourth method step, on the one hand, the first public key is decrypted using the second public key and, on the other hand, the identity information (i.e. the received encrypted response message) is decrypted using the decrypted first public key by the server device 11, so that the response message (and as part thereof in particular the identity information also) occurs or is present in unencrypted form in the server device.

The preparation of the SIM card according to the first method step of the method according to invention takes place (according to both the first and the second embodiments) during the normal production of SIM cards or identity modules or SmartCards on the premises of a SIM card manufacturer. A Java Card™ applet is loaded there with the normal processes onto the SIM card and the generation of an asymmetric key pair (the SIM key pair or the first key pair, allocated to the identity module or the SIM card) is subsequently started. This procedure can be significantly speeded up by using a crypto-coprocessor, so that it takes only a few seconds. Once the key pair is generated, the private server key (or second private key) of the server, which is intended to authenticate the customer, is loaded onto the SIM card in a secure manner by the personalization system.

According to a further preferred embodiment of the present invention, it is provided that—if necessary—the private server key is again encrypted by the server operator and the key required for decryption is, for example, already compiled into the applet code, i.e. is stored in a memory of the SIM card.

According to a preferred embodiment of the present invention, it is possible that a plurality of key pairs allocated to the server device are used or a plurality of key pairs are used which are allocated to a plurality of (different) server devices. In this situation, a plurality of server key pairs are accordingly present and must also be present at the time of manufacture of the SIM card or the identity module and must be treated in the same way as the second key pair (or the server key pair). This means that, along with the second key pair (allocated to the server device), a third key pair is present, which, for example, is similarly allocated to the server device (as a further key pair of this server device) or is allocated to a further server device (as the server key pair of this further server device). According to the invention, it is possible in this way that a plurality of different server key pairs (second key pair, third key pair, fourth key pair, etc.) are treated in the manufacture of the SIM card 21 in the same way as the second key pair. It is thus advantageously possible according to the invention that a plurality of server operators can identify the customer with a SIM card 21. The additional server keys are loaded onto this SIM card in the same, secure, manner and are used (in the first embodiment of the invention) to generate signatures of the public SIM key or (in the second embodiment of the invention) to encrypt the public SIM key.

It is provided in particular according to the invention that—after the private key of the server has been loaded onto the card—according to the first embodiment, a signature is formed from the previously generated public SIM key of the SIM card (i.e. the first public key) with the private server key (i.e. the second private key) or, according to the second embodiment, the previously generated public SIM key of the SIM card (i.e. the first public key) is encrypted with the private server key (i.e. the second private key). The private server key is then immediately deleted on the SIM card 21 and is therefore no longer located on the SIM card and cannot therefore be compromised either if the SIM card is outside the manufacturing operation, for example in the hand of the user.

Since, according to the first embodiment, the public SIM key remains on the card, it is possible—depending on subsequent need—to transmit a new private server key to the SIM card via established secure protocols in order to produce a new signature of the public SIM key. The need for this operation could lie e.g. in the compromising and therefore the necessary replacement of the server key pair. A different reason could be a new business partner, whose further server key pair is intended to be able to authenticate the identity module of the user. According to the second embodiment, it can be provided (in particular in order to save memory space on the SIM card 21) that the public SIM key of the SIM card 21 is similarly deleted from the SIM card at the end of the personalization, i.e. at the end or temporally after the first method step. However, if, in the second embodiment, the public SIM key remains on the card, it is possible—depending on subsequent need—to transmit a new private server key to the SIM card via established secure protocols in order to produce a new signature of the public SIM key. The need for this operation could similarly lie e.g. in the compromising and the therefore necessary replacement of the server key pair. A different reason could be a new business partner, whose further server key pair is intended to be able to authenticate the identity module of the user.

Alternatively to the carrying out (according to the first embodiment) of the signing of the public SIM key using the private server key (or the private further server key (i.e. the third private key)) within the SIM card 21, or (according to the second embodiment) of the encryption of the public SIM key using the private server key (or the private further server key (i.e. the third private key)) within the SIM card 21, it can also be provided according to the invention that the public SIM key (i.e. the first public key), for example when the identity module 21 is first commissioned, is transmitted onto a server of the mobile operator (and—but only according to the second embodiment—is then deleted on the SIM card 21). The carrying out of the signing (of the public SIM key) with the private server key (or the private further server key (i.e. the third private key), for example of a further provider) can take place on this server (of the mobile provider) according to such an alternative embodiment of the first embodiment of the present invention, and the generated signature can be transmitted thereafter to the SIM card 21. Accordingly, the carrying out of the encryption (of the public SIM key) with the private server key (or the private further server key (i.e. the third private key), for example of a further provider) can take place according to such an alternative embodiment of the second embodiment of the present invention on this server (of the mobile provider), and the encrypted public SIM key can be transmitted thereafter once more to the SIM card 21.

The first method step is thus concluded. The operation of a SIM card 21 or an identity module 21 prepared in this way according to the present invention, interacting with a server device 11 for the purpose of user authentication of the telecommunication terminal 20 of the user or for authentication of the identity module 21 (in particular the SIM card 21), will be explained below.

In the use of the SIM card 21, an authentication prompt is generated either in an application of the telecommunication terminal 20 or by the server device 11. The command is transmitted by this authentication prompt to the SIM card 21 (more specifically to the applet program on the SIM card 21) to issue the IMSI number (or generally the identity information in the form of a signed response message) as a signed message (first embodiment of the invention) or the IMSI number (or generally the identity information in the form of an encrypted response message) as an encrypted message (second embodiment). The applet or the applet program first reads out from a directory on the SIM card (i.e. from a memory area 22 of the SIM card 21) the IMSI information stored there. To hinder cryptographic attacks (with fraudulent intent), a random number with a specific (predefined) length is incorporated into the response message (in particular in addition to the identity information or in addition to the IMSI information), and a hash (coefficient of variation) is formed from the response message using a suitable mathematical one-way function. This coefficient of variation is filled with filler bytes up to the necessary size and therefrom a signature is formed (first embodiment) or encrypted (second embodiment) with the private SIM key. As explained above, a data element characterizing a successful PIN check can, where appropriate, also be incorporated into the message. This PIN is similarly stored within the SIM card, possibly within the applet necessary for this invention, and never leaves the card.

If the use of a plurality of different server key pairs is provided (i.e. along with the second key pair, temporally after one another or parallel thereto, a third key pair and, where appropriate, also further (fourth, fifth, etc.) key pairs), a data element is also added in the transfer of the response message to characterize or identify the private server key used to sign (first embodiment) or encrypt (second embodiment) the public SIM key.

The second method step is thus carried out.

The data (i.e. the response message to the authentication request), (in the case of the first embodiment the public SIM key and the two signatures, in the case of the second embodiment the encrypted public SIM key) are transmitted during the third method step by the application present on the mobile terminal, in particular via the Internet, optionally via an SSL/TLS or similarly secured connection, to the server device which identifies the customer or the identity module. The data element which identifies the private server key used to encrypt the public SIM key is also to be transmitted, where appropriate, along with the response message.

The third method step is thus carried out.

According to the fourth method step, the signatures of the public SIM key and the response message are checked on the server device (first embodiment) or the encrypted public SIM key and the encrypted response message are decrypted on the server device (second embodiment). This is possible because the public server key is accessible to the server device 11 (said key is located on the server device 11). However, with this public server key (or second public key or, however, also third or fourth public key, depending on the content of any data element transmitted in addition to the encrypted response message), the signature of the public SIM key is checked (first embodiment) or the encrypted public SIM key is decrypted, as a result of which the public SIM key (or first public key) is obtained in clear text (second embodiment). Furthermore, in the fourth method step, the (just checked (first embodiment) or just obtained in clear text or calculated (second embodiment)) public SIM key is used to check (first embodiment) or decrypt (second embodiment) the signed (first embodiment) or encrypted (second embodiment) data block (i.e. the signed response message according to the first embodiment or the encrypted response message according to the second embodiment).

If these operations are successful (i.e. according to the first embodiment the calculated clear text information corresponds to the transmitted clear text information and, according to the second embodiment, this operation produces a result which obtains the expected data structure with the various TLV-coded elements) it can be assumed that the two cryptographic operations carried out on the server have been carried out with keys that match one another.

On conclusion of the second sub-step of the fourth method step (i.e. following the check of the signature of the response message in the first embodiment or following the decryption of the response message in the second embodiment), the fourth method step is carried out. According to one variant of the second embodiment, recognition information could also be contained in the clear text of the public SIM key, so that, even after the first sub-step of the fourth method step (i.e. following the decryption of the public SIM key), it is already recognizable whether this sub-step was successful or not.

The two operations of the fourth method step concatenated with one another cryptographically prove:

It is clearly established that the public SIM key has actually been transmitted by a SIM card on which the private server key was used to sign the public SIM key (first embodiment) or to encrypt the public SIM key (second embodiment). Since the private server key is located on the SIM card for only a short time during the personalization of the latter (or is present only during the manufacture of the SIM card), the public SIM key must have been signed (first embodiment) or decrypted (second embodiment) at this time. This can happen only if the SIM card was manufactured by the issuer of the private server key.

Furthermore, the private SIM key associated with this public SIM key has been used to sign (first embodiment) or to encrypt (second embodiment) the message (or response message) dispatched to the server device 11. It can thus be reliably established that the identity information (or IMSI number) contained in the message (or response message) has actually been read out from a SIM card which originates from the issuer or the client commissioning the manufacture of this SIM card and can be identified via this IMSI number (or other identity information).

If the PIN information check was additionally required, it is furthermore ensured that the customer was in possession of this SIM card at the time of his identification and consented to the identification.

In the case of asymmetric encryption methods, the complete original data for the asymmetric operation are not generally used for performance reasons. Depending on the application, a hash value of the data is signed (authentication), or the data are encrypted with a symmetric key and this symmetric key is in turn asymmetrically encrypted.

Further variants of the method according to the invention are described below:

Anyone in possession of the public server key can check the authenticity of the customer using the identity information or the IMSI information. The business model, for example, of a service provider, thus determines how the latter uses this server key.

If the public server key is published, anyone can uniquely identify a user of the identity module 21. For example, in the case of programming of applications for a telecommunication terminal, it is possible for a manufacturer of such an application to carry out this identification of the user.

If the public server key is kept secret, only the owner of this server key pair can uniquely identify an identity module or a user of the identity module.

It is traditionally difficult for service providers on the Internet to uniquely identify customers. Using the present invention, it is possible for a service provider, for example in the context of an Internet service (Web service), to uniquely identify a user or customer (using the identity information). It can also be provided that the service consists only in uniquely identifying a customer (using the identity information). This would be an example of a generic service (as a service to other service providers, in particular on the Internet). However, it can also be provided that the customer identification is merely a part of a service of a service provider.

For a service-specific design, it is appropriate that the service provider provides both a server contactable via the Internet and an application for a mobile terminal. If the user or customer then wishes to use the service on the Internet, the Internet server of the service provider transmits a message to the application on the mobile terminal. As already described, this application causes the applet on the SIM card 21 to generate an authentication message (i.e. the encrypted response message). This response message is forwarded via the server of the service provider to the server of the owner of the server key. The response message is then decrypted and verified as described. The service provider then receives a notification indicating whether the customer could be identified.

The customer can then use the web service either via the mobile terminal (if the data link between the mobile terminal and the service provider has not been interrupted, the service provider can be sure of communicating with the same customer). If the customer wishes to use the service via a workstation computer or private computer connected to the Internet, the service provider can transmit information, for example in the form of PIN information, to the application on the mobile terminal. The customer must enter this information when logging in to the workstation computer or private computer.

The generic solution functions in a similar manner to the service-specific variant, but the communication between the mobile application, the server of the service provider and the server carrying out the user authentication takes place differently.

The initial starting situation is identical to the previous scenario: The user wishes to use a service in which he must authenticate himself in advance. In the generic variant, the mobile application and the authentication server are provided by the provider of the authentication service or the mobile provider.

If the customer wishes to register for the use of a service, he uses the mobile application to display the Internet page of the service provider. The server of the service provider registers the contact and sends back a Hypertext Markup Language (HTML) page on which, along with the actual response page, for example a so-called "iFrame" element is located. This iFrame element contains an embedded link to the provider of the authentication service. This link contains information (a "token") which uniquely identifies this authentication request. The server of the service provider simultaneously contacts the server of the authentication service via a second interface and transfers the token (or the information) embedded in the link in the HTML page via a first interface.

If the customer or user clicks on the displayed link, he is forwarded to a server of the authentication provider. As soon as this happens, the authentication server transmits the request to generate the authentication message to the mobile application. This message is generated as described and forwarded to the authentication server. After checking the authentication, the authentication server contacts the server of the service provider and transfers the information indicating whether the customer has been authenticated together with the original token.

Through the use of the iFrame element in the original response page of the service provider, the Internet display program (i.e. the browser) of the customer has, on the one hand, kept open the link to the service provider, and, on the other hand, due to the clicking on the link to the authentication provider within the iFrame element, has contacted said authentication provider. Since the service provider is still in contact with the customer due to the link that has been kept open, he can be sure of having identified the customer.

According to a further preferred alternative (of both embodiments) of the method according to the invention, it is provided that—after the public SIM key has been signed (first embodiment) or encrypted (second embodiment) with the private server key, for example of the mobile operator, during the SIM card production—the signature of the SIM key and the latter itself (first embodiment) or the encrypted SIM key (second embodiment) is transferred to a server or a server device, for example of the mobile operator. The latter checks with the public server key that the SIM key is authenticated and stores the SIM key securely in a database.

If the case occurs wherein the server key has to be replaced or a new server key for a new service partner is to be additionally stored on the SIM card, the private SIM key can be signed on the server with the new private server key and the generated signature can be loaded onto the SIM card via secured communication channels (first embodiment) or the private SIM key can be encrypted on the server with the new private server key and can be loaded onto the SIM card via secured communication channels (second embodiment).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for authenticating, on a server device in a telecommunications network, a telecommunications terminal comprising an identity module, wherein identity information uniquely allocated to the identity module is used for the authentication using asymmetric cryptography, wherein a first key pair comprising a first public key and a first private key is allocated to the identity module, and wherein a second key pair comprising a second public key and a second private key is allocated to the server device, the method comprising;

storing, at the identity module, the first private key, the first public key and a first signature, the first signature being based on signing the first public key using the second private key;
generating the identity information and a second signature, the second signature being based on signing the identity information using the first private key;
transmitting the first public key, the identity information, and the first and second signatures to the server device;
verifying, by the server device, the authenticity of the first public key using the second public key; and
verifying, by the server device, the authenticity of the identity information using the verified first public key;
wherein the identity information comprises International Mobile Subscriber Identity (IMSI) information corresponding to the identity module.

2. The method according to claim 1, wherein the telecommunications terminal has a user interface, and the method further comprises, before or during the generating step:
providing user input of confidential information via the user interface.

3. The method according to claim 1, wherein the transmitting utilizes an encryption protocol.

4. The method according to claim 1, wherein the transmitting further comprises:
transmitting counter information, wherein the transmission of the counter information allows the server device to distinguish between first and second messages transmitted to the server device during the transmitting using a database corresponding to the server device.

5. The method according to claim 1, wherein a third key pair comprising a third public key and a third private key is allocated to the server device or to a further server device;
wherein the storing further comprises storing a third signature at the identity module, the third signature being based on signing the first public key with the third private key;
wherein the transmitting further comprises transmitting the third signature to the server device: and
wherein the method further comprises:
verifying, by the server device, the third signature using the third public key; and
verifying, by the server device, the first signature using the first public key.

6. The method according to claim 1, wherein the identity module is a Subscriber Identity Module (SIM) card or a Universal Subscriber Identity Module (USIM) card.

7. A method for authenticating, on a server device in a telecommunications network, a telecommunications terminal comprising an identity module, wherein identity information uniquely allocated to the identity module is used for the authentication using asymmetric cryptography, wherein a first key pair comprising a first public key and a first private key is allocated to the identity module, and wherein a second key pair comprising a second public key and a second private key is allocated to the server device, the method comprising:
storing, at the identity module, the first private key and the first public key, wherein the first public key is stored in an encrypted form, the encrypted form being based on signing the first public key using the second private key;
generating, by the identity module, the identity information in an encrypted form using the first private key;
transmitting the encrypted first public key and the encrypted identity information to the server device;
decrypting, by the server device, the encrypted first public key using the second public key; and
decrypting, by the server device, the encrypted identity information using the decrypted first public key.

8. The method according to claim 7, wherein the telecommunications terminal has a user interface, and the method further comprises, before or during the generating step:
providing user input of confidential information via the user interface.

9. The method according to claim 7, wherein the transmitting utilizes an encryption protocol.

10. The method according to claim 7, wherein the transmitting further comprises:
transmitting counter information, wherein the transmission of the counter information allows the server device to distinguish between first and second messages transmitted to the server device during the transmitting using a database corresponding to the server device.

11. The method according to claim 7, wherein a third key pair comprising a third public key and a third private key is allocated to the server device or to a further server device;
wherein the storing further comprises storing the first public key in a further encrypted form based on signing the first public key using the third private key;
wherein the transmitting further comprises transmitting the first public key in the further encrypted form to the server device; and
wherein the method further comprises:
decrypting, by the server device, the first public key in the further encrypted form using the third public key.

12. The method according to claim 11, wherein the identity information is international Mobile Subscriber Identity (IMSI) information of the identity module.

13. The method according to claim 7, wherein the identity module is a Subscriber Identity Module (SIM) card or a Universal Subscriber Identity Module (USIM) card.

14. A system for authenticating, by a server device of a telecommunications network, a telecommunications terminal comprising an identity module, Wherein identity information uniquely allocated to the identity module is used for the authentication using asymmetric cryptography, wherein a first key pair comprising a first public key and a first private key is allocated to the identity module, and wherein a second key pair comprising a second public key and a second private key is allocated to the server device, the system comprising:
the identity module, wherein the identity module is configured to:
store the first private key, the first public key and a first signature, the first signature being based on signing the first public key using the second private key;
generate a second signature, the second signature being based on signing the identity information using the first private key; and
the server device, wherein the server device is configured to:
check the first signature using the second public key; and
check the second signature using the first public key;
wherein the identity information comprises International Mobile Subscriber identity (IMSI) information corresponding to the identity module.

15. A system for authenticating, by a server device of a telecommunications network, a telecommunications terminal comprising an identity module, wherein identity information uniquely allocated to the identity module is used for the authentication using asymmetric cryptography, wherein a first key pair comprising a first public key and a first private key is allocated to the identity module, and wherein a second key pair comprising a second public key and a second private key is allocated to the server device, the system comprising:

the identity module, wherein the identity module is configured to:
  store the first private key and the first public key, wherein the first public key is stored in an encrypted form, wherein the encrypted form is based on signing the first public key using the second private key;
  generate the identity information in an encrypted form using the first private key; and
the server device, wherein the server device is configured to:
  decrypt the first public key using the second public key; and
  decrypt the identity information using the decrypted first public key.

16. A non-transitory, processor-readable medium having processor-executable instructions stored thereon for authenticating, on a server device in a telecommunications network, a telecommunications terminal comprising an identity module, wherein identity information uniquely allocated to the identity module is used for the authentication using asymmetric cryptography, wherein a first key pair comprising a first public key and a first private key is allocated to the identity module, and wherein a second key pair comprising a second public key and a second private key is allocated to the server device, the processor-executable instructions, when executed by a processor, causing the following steps to be performed:
  storing, at the identity module, the first private key, the first public key and a first signature, the first signature being based on signing the first public key using the second private key;
  generating the identity information and a second signature, the second signature being based on signing the identity information using the first private key;
  transmitting the first public key, the identity information, and the first and second signatures to the server device;
  verifying, by the server device, the authenticity of the first public, key using the second public key; and
  verifying, by the server device, the authenticity of the identity information using the verified first public key;
  wherein the identity information comprises International Mobile Subscriber Identity (IMSI) information corresponding to the identity module.

17. A non-transitory, processor-readable medium having processor-executable instructions stored thereon for authenticating, on a server device in a telecommunications network, a telecommunications terminal comprising an identity module, wherein identity information uniquely allocated to the identity module is used for the authentication using asymmetric cryptography, wherein a first key pair comprising a first public key and a first private key is allocated to the identity module, and wherein a second key pair comprising a second public key and a second private key is allocated to the server device, the processor-executable instructions, when executed by a processor, causing the following steps to be performed:
  storing, at the identity module, the first private key and the first public key, wherein the first public key is stored in an encrypted form, the encrypted form being based on signing the first public key using the second private key;
  generating, by the identity module, the identity information in an encrypted form using the first private key;
  transmitting the encrypted first public key and the encrypted identity information to the server device;
  decrypting, by the server device, the encrypted first public key using the second public key; and
  decrypting, by the server device, the encrypted identity information using the decrypted first public key.

\* \* \* \* \*